(12) United States Patent
Osa

(10) Patent No.: US 9,405,961 B2
(45) Date of Patent: Aug. 2, 2016

(54) INFORMATION PROCESSING APPARATUS, DISTRIBUTING IDENTICIAL IMAGE DATA IN PARALLEL FOR OBJECT DETECTION AND RESOLUTION CONVERSION

(75) Inventor: Kinya Osa, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 17 days.

(21) Appl. No.: 13/447,000

(22) Filed: Apr. 13, 2012

(65) Prior Publication Data

US 2012/0269390 A1   Oct. 25, 2012

(30) Foreign Application Priority Data

Apr. 20, 2011   (JP) ................................. 2011-094376

(51) Int. Cl.
*G06K 9/00* (2006.01)
*G06T 1/60* (2006.01)
*G06T 3/40* (2006.01)

(52) U.S. Cl.
CPC .............. *G06K 9/00255* (2013.01); *G06T 1/60* (2013.01); *G06T 3/40* (2013.01)
USPC ........... 382/103; 382/100; 382/276; 382/293; 382/298; 382/299; 348/135; 348/143; 348/152; 348/169

(58) Field of Classification Search
None
See application file for complete search history.

(56) References Cited

U.S. PATENT DOCUMENTS

| | | | | |
|---|---|---|---|---|
| 8,508,603 | B2 * | 8/2013 | Sugisawa ................. | 348/208.14 |
| 2006/0072845 | A1 * | 4/2006 | Eck et al. ..................... | 382/265 |
| 2006/0228027 | A1 * | 10/2006 | Matsugu et al. .............. | 382/181 |
| 2007/0217690 | A1 * | 9/2007 | Dempski et al. .............. | 382/228 |
| 2008/0050022 | A1 * | 2/2008 | Okada et al. .................. | 382/209 |
| 2008/0112648 | A1 * | 5/2008 | Hatano ......................... | 382/298 |
| 2009/0003708 | A1 * | 1/2009 | Steinberg et al. ............. | 382/190 |
| 2009/0245649 | A1 * | 10/2009 | Nakatsuka .................... | 382/195 |
| 2009/0324085 | A1 | 12/2009 | Leung | |
| 2010/0182462 | A1 | 7/2010 | Utsugi | |
| 2011/0090340 | A1 * | 4/2011 | Hashiguchi ................... | 348/152 |
| 2011/0164149 | A1 * | 7/2011 | Sugisawa ................. | 348/231.99 |
| 2011/0205398 | A1 * | 8/2011 | Hatano .................... | 348/231.99 |
| 2012/0050334 | A1 * | 3/2012 | Velthoven et al. ............ | 345/660 |

FOREIGN PATENT DOCUMENTS

| | | |
|---|---|---|
| CN | 1241758 | 1/2000 |
| CN | 1729481 | 2/2006 |
| CN | 1967566 | 5/2007 |

(Continued)

OTHER PUBLICATIONS

Machine language translation of Japanese Publication No. 2008-102611A—translated on Sep. 7, 2013.*
Lai et al. "Proposed FPGA Hardware Architecture for High Frame Rate (>100 fps) Face Detection Using Feature Cascade Classifiers", 2007, IEEE.*

(Continued)

*Primary Examiner* — Jason Heidemann
(74) *Attorney, Agent, or Firm* — Fitzpatrick, Cella, Harper & Scinto

(57) ABSTRACT

An image processing apparatus comprising a storage unit configured to store image data; a readout unit configured to read out the image data stored in the storage unit; a detection unit configured to detect a target object from the image data read out by the readout unit; a conversion unit configured to convert a resolution of the image data read out by the readout unit; and a write unit configured to write the image data having the resolution converted by the conversion unit in the storage unit, wherein the readout unit outputs the readout image data in parallel to the detection unit and the conversion unit.

6 Claims, 13 Drawing Sheets

(56) References Cited

FOREIGN PATENT DOCUMENTS

| JP | 2008102611 A | 5/2008 |
|---|---|---|
| JP | 2008210009 A | 9/2008 |
| WO | 2010/116763 | 10/2010 |

OTHER PUBLICATIONS

Rowley et al., "Neural Network-Based Face Detection", Jan. 1998, IEEE Transactions on Pattern Analysis and Machine Intelligence, vol. 20, No. 1, pp. 23-37.*

Chinese Office Action dated Dec. 2, 2014 issued during prosecution of related Chinese application No. 201210120010.X. (Whole English-language translation included.).

Palomera-Perez, et al., "Parallel Multiscale Feature Extraction and Region Growing: Application in Retinal Blood Vessel Detection", IEEE, vol. 14, No. 2, Mar. 1, 2010, pp. 500-506, XP011345671.

European Search Report issued Feb. 16, 2015 during prosecution of related European application No. 12163896.9.

* cited by examiner

INFORMATION PROCESSING APPARATUS, DISTRIBUTING IDENTICAL IMAGE DATA IN PARALLEL FOR OBJECT DETECTION AND RESOLUTION CONVERSION

BACKGROUND OF THE INVENTION

1. Field of the Invention

The present invention relates to an image processing apparatus which generates a resized image and performs processing such as image recognition, a control method thereof, and a storage medium.

2. Description of the Related Art

To detect target objects of various sizes when performing image recognition processing such as face detection, it is common practice to generate pyramid images by resizing an original image, and perform detection processing for each pyramid image.

Japanese Patent Laid-Open No. 2008-102611 discloses a method of sequentially resizing a read image at a predetermined ratio to generate pyramid images, and then performing face discrimination processing in order to detect a face at a plurality of sizes. FIG. 1 exemplifies pyramid images for detecting a target object at various sizes. An input image 101 of 320 pixels×240 pixels is resized at every 1/1.2 ratio in each of the horizontal and vertical directions, thereby generating resized images 102 to 109 (resized images A to H) at eight levels in the same way. Target object detection processing is performed for the input image and resized images, that is, images of nine resolutions. As a result, the target object can be detected at different sizes.

Japanese Patent Laid-Open No. 2008-210009 discloses an image discrimination apparatus which performs discrimination processing by an arrangement in which resized image data generated by a multi-resolution processor are sequentially supplied to a normalization processor, feature amount derivation unit, and recognition unit via a pipeline connection without the mediacy of a bus.

Access processing to an image memory described in Japanese Patent Laid-Open No. 2008-102611 when sequentially resizing a read image to generate pyramid images and performing detection processing after pyramid image generation will be explained with reference to FIGS. 2A and 2B. FIG. 2A is a view for explaining image access in resize processing of generating pyramid images. When generating pyramid images at nine resolutions, as shown in FIG. 1, first, the input image 101 is read out from the image memory and undergoes resize processing, and the resized image 102 is written in the image memory. Then, the resized image 102 is read out from the image memory and undergoes resize processing, and the resized image 103 is written in the image memory. As for the resized images 103 to 109, readout processing from the image memory, resize processing, and write processing in the image memory are repeated in the same way until the minimum resized image 109 is written in the image memory.

FIG. 2B is a view for explaining image access when performing detection processing after pyramid image generation. First, the input image 101 is read out from the image memory and undergoes detection processing at the highest resolution. An output from detection processing is information about a detected target object, and write processing of an image in the image memory is not executed, unlike FIG. 2A. The resized images 102 to 109 are also read out from the image memory and undergo detection processing without performing write processing of an image in the image memory.

The memory access count can be represented by a pixel count when the pyramid images described with reference to FIG. 1 are processed as shown in FIGS. 2A and 2B. A readout count Ra from the image memory and a write count Wa in the image memory in FIG. 2A, and a readout count Rb from the image memory in FIG. 2B are calculated in accordance with equations (1):

$$\left. \begin{array}{l} Ra = 76800 + 53200 + 36686 + \cdots + 5655 = 235688 \\ Wa = 53200 + 36686 + 25392 + \cdots + 3888 = 162776 \\ Rb = 76800 + 53200 + 36686 + \cdots + 5655 + 3888 = 239576 \end{array} \right\} \quad (1)$$

As shown in FIG. 1, the pixel count of the input image 101 is 76,800, that of the resized image 102 is 53,200, that of the resized image 103 is 36,686, ..., that of the resized image 108 is 5,655, and that of the resized image 109 is 3,888. The readout count Ra is the sum of the pixel counts of the input image 101 and resized images 102 to 108. The write count Wa is the sum of the pixel counts of the resized images 102 to 109. The readout count Rb is the sum of the pixel counts of the input image 101 and resized images 102 to 109.

An access count N (pixel count) to the image memory in the processing of FIGS. 2A and 2B is calculated by adding all the readout count Ra, write count Wa, and readout count Rb in accordance with equation (2):

$$N = Ra + Wa + Rb = 235688 + 162776 + 239576 = 638040 \quad (2)$$

As is apparent from equations (1), the input image 101 and resized images 102 to 108 are read out twice from the image memory. For this reason, the method disclosed in Japanese Patent Laid-Open No. 2008-102611 increases the access count to the image memory and takes time for processing.

Further, access to an image memory described in Japanese Patent Laid-Open No. 2008-210009 while performing resize processing for a read image and performing detection processing for the resized images using a pipeline arrangement will be explained with reference to FIG. 3.

FIG. 3 shows access to the image memory when resize processing from a resolution corresponding to the input image 101 to a resolution corresponding to the resized image 109, and detection processing are executed with the pipeline arrangement. At all detection resolutions, the input image 101 is read out from the image memory. The input image 101 is resized, as needed, and is directly transferred to the detection processing unit. An output from the detection processing unit is information about a detected target object, and write processing of an image in the image memory is not executed.

The memory access count can be represented by a pixel count when the pyramid images described with reference to FIG. 1 are processed as shown in FIG. 3. A readout count R from the image memory is calculated in accordance with equation (3):

$$R = 76800 + 76800 + 76800 + \ldots 76800 = 76800 \times 9 = 691200 \quad (3)$$

In processing as described in FIG. 3, only readout from the image memory is executed. Thus, the access count N (pixel count) to the image memory is N=R=691,200 pixels.

However, the method disclosed in Japanese Patent Laid-Open No. 2008-210009 does not perform write processing in the image memory, but increases the access count to the image memory because the resolution of an image read out from the image memory is high.

SUMMARY OF THE INVENTION

In consideration of the aforementioned problems, the present invention provides a technique of resizing the access count to an image memory.

According to one aspect of the present invention, there is provided an image processing apparatus comprising: a storage unit configured to store image data; a readout unit configured to read out the image data stored in the storage unit; a detection unit configured to detect a target object from the image data read out by the readout unit; a conversion unit configured to convert a resolution of the image data read out by the readout unit; and a write unit configured to write the image data having the resolution converted by the conversion unit in the storage unit, wherein the readout unit outputs the readout image data in parallel to the detection unit and the conversion unit.

According to one aspect of the present invention, there is provided a method of controlling an image processing apparatus which detects a target object from image data, comprising: a readout step of reading out the image data stored in a storage unit; a detection step of causing a detection unit to detect the target object from the image data read out in the readout step; a conversion step of causing a conversion unit to convert a resolution of the image data read out in the readout step; and a write step of writing, in the storage unit, converted data having the resolution converted in the conversion step, wherein in the readout step, the readout image data is output in parallel to the detection unit and the conversion unit.

Further features of the present invention will be apparent from the following description of exemplary embodiments with reference to the attached drawings.

DESCRIPTION OF THE EMBODIMENTS

An exemplary embodiment(s) of the present invention will now be described in detail with reference to the drawings. It should be noted that the relative arrangement of the components, the numerical expressions and numerical values set forth in these embodiments do not limit the scope of the present invention unless it is specifically stated otherwise.

First Embodiment

Figure 4:
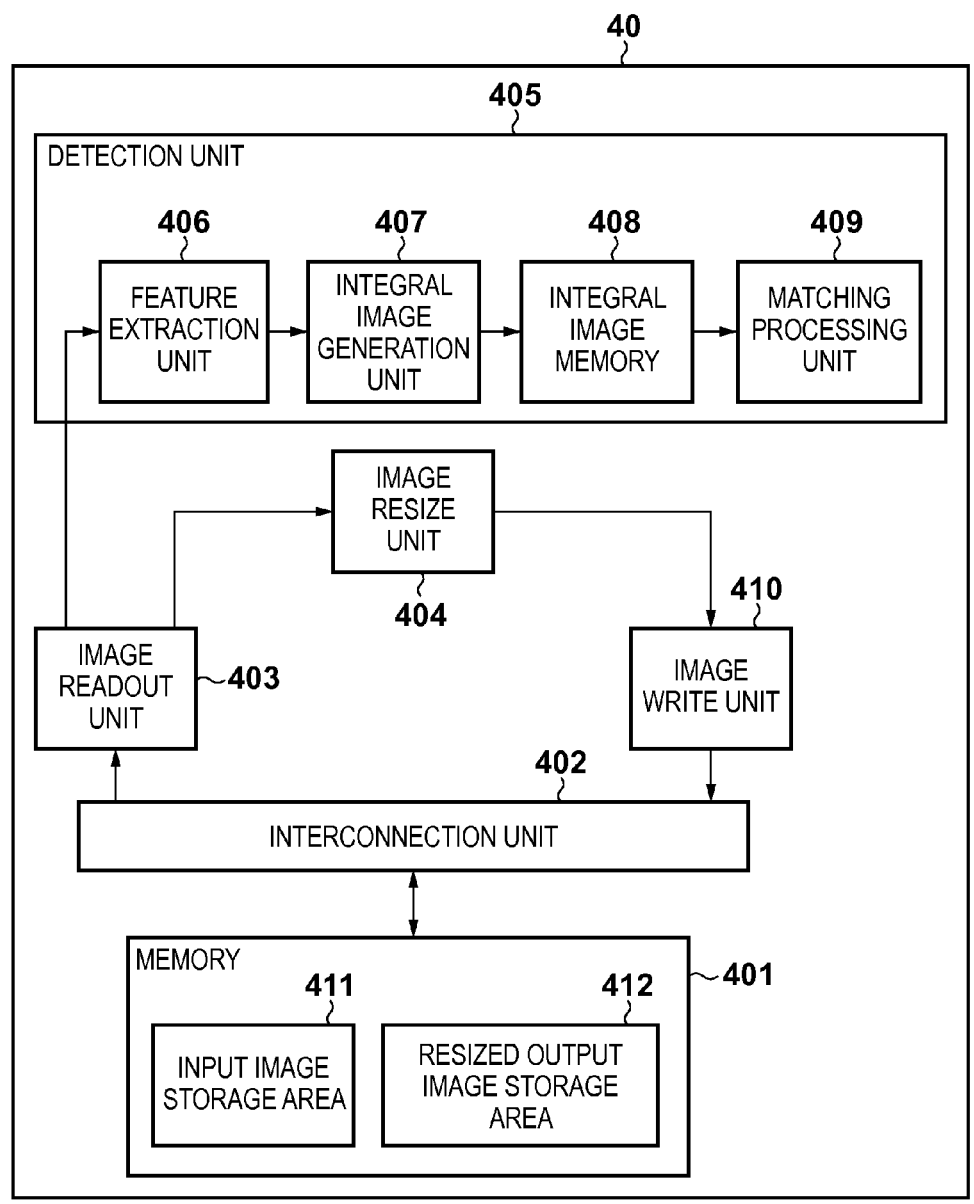
FIG. 4 is a block diagram showing the functional arrangement of an image processing apparatus according to the first embodiment.

The first embodiment of the present invention will be described below with reference to the accompanying drawings. FIG. 4 exemplifies the functional arrangement of an image processing apparatus 40 according to the first embodiment. The image processing apparatus 40 includes a memory 401, interconnection unit 402, image readout unit 403, image resize unit 404, detection unit 405, and image write unit 410. The memory 401 includes an input image storage area 411 and resized output image storage area 412. The detection unit 405 includes a feature extraction unit 406, integral image generation unit 407, integral image memory 408, and matching processing unit 409.

The interconnection unit 402 is, for example, a connection unit for a bus, crossbar switch, and the like. The interconnection unit 402 controls connection between the memory 401, the image readout unit 403, and the image write unit 410.

The image readout unit 403 reads out an input image or resized image (converted data obtained by converting the resolution) from the input image storage area 411 or resized output image storage area 412 of the memory 401. The image readout unit 403 includes two output ports for outputting an input image read out from the input image storage area 411 or a resized image read out from the resized output image storage area 412 to the image resize unit 404 and detection unit 405. The image readout unit 403 and image write unit 410 are connected to the memory 401 via the interconnection unit 402.

The image resize unit 404 receives an input image or resized image from the image readout unit 403, and performs resize processing to reduce the input image or resized image using a method such as bilinear interpolation, bicubic interpolation, or simple subsampling as an image resize algorithm. A resized image output from the image resize unit 404 is transmitted to the image write unit 410, and written in the resized output image storage area 412 by the image write unit 410.

The detection unit 405 detects the presence/absence of a target object in an image received from the image readout unit 403. The target object is, for example, a face or human body, but is not limited to them.

The feature extraction unit 406 extracts a feature amount from an input image or resized image read out by the image readout unit, and transmits the extracted feature amount to the integral image generation unit 407.

The integral image generation unit 407 two-dimensionally accumulates feature amounts extracted by the feature extraction unit 406, generates an integral image of the feature amounts, and stores it in the integral image memory 408.

The integral image memory 408 holds a necessary number of integral images for matching processing of a target object by the matching processing unit 409. The matching processing unit 409 reads out necessary integrated feature amounts from the integral image memory 408, and executes matching with the target object to detect the presence/absence of the target object.

The image write unit 410 writes a resized output image in the resized output image storage area 412 of the memory 401. The input image storage area 411 stores an input image. The resized output image storage area 412 stores resized images for pyramid image generation.

Figure 5:
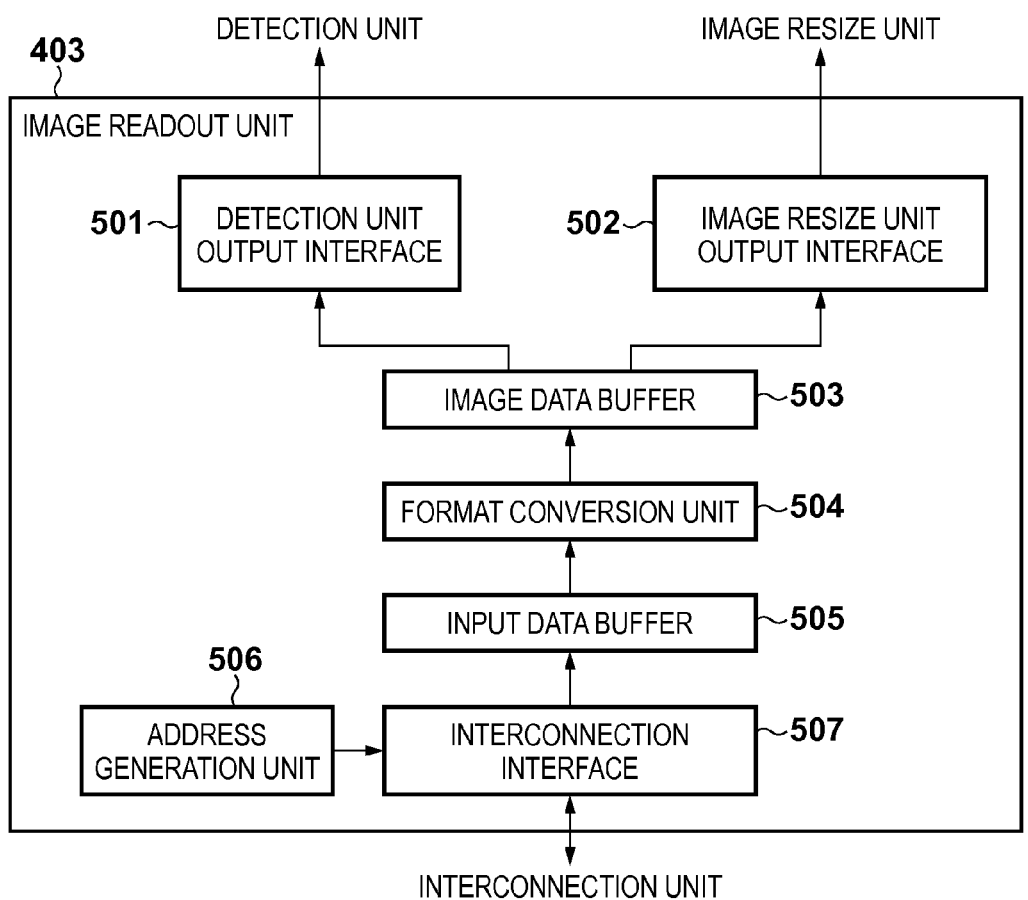
FIG. 5 is a block diagram showing the arrangement of an image readout unit.

FIG. 5 exemplifies the functional arrangement of the image readout unit 403. The image readout unit 403 includes a detection unit output interface 501, image resize unit output interface 502, image data buffer 503, format conversion unit 504, input data buffer 505, address generation unit 506, and interconnection interface 507.

In the image readout unit 403, first, the address generation unit 506 generates the readout address of an input image (image data), and transmits it to the interconnection interface 507. Then, the interconnection interface 507 reads out image data from the memory 401 via the interconnection unit 402 based on the address generated by the address generation unit 506. The interconnection interface 507 transmits the readout image data to the input data buffer 505. The input data buffer 505 is a buffer for temporarily holding image data input from the interconnection interface 507 for conversion processing by the format conversion unit 504. The format conversion unit 504 reads out the image data held by the input data buffer 505, and converts the data format into a format suitable for processes by the detection unit 405 and image resize unit 404. The contents of conversion include, for example, division in the byte or bit unit, padding, data sorting, and color space conversion. The image data buffer 503 is a buffer for temporarily holding image data converted into a format suited to internal processing by the format conversion unit 504. Image data held in the image data buffer 503 is read out to both the detection unit output interface 501 and image resize unit output interface 502, and the same image data is sent to both of them. The detection unit output interface 501 reads out image data from the image data buffer 503 and sends it to the detection unit 405. At this time, if conversion into a data format suitable for the detection unit 405 is necessary, conversion processing is executed. The contents of conversion processing include, for example, extraction of necessary bits, bit width expansion, padding, and bit concatenation. Similarly, the image resize unit output interface 502 reads out image data from the image data buffer 503, and sends it to the image resize unit 404. At this time, if conversion into a data format suitable for the image resize unit 404 is necessary, conversion processing is performed similarly.

Figure 6:
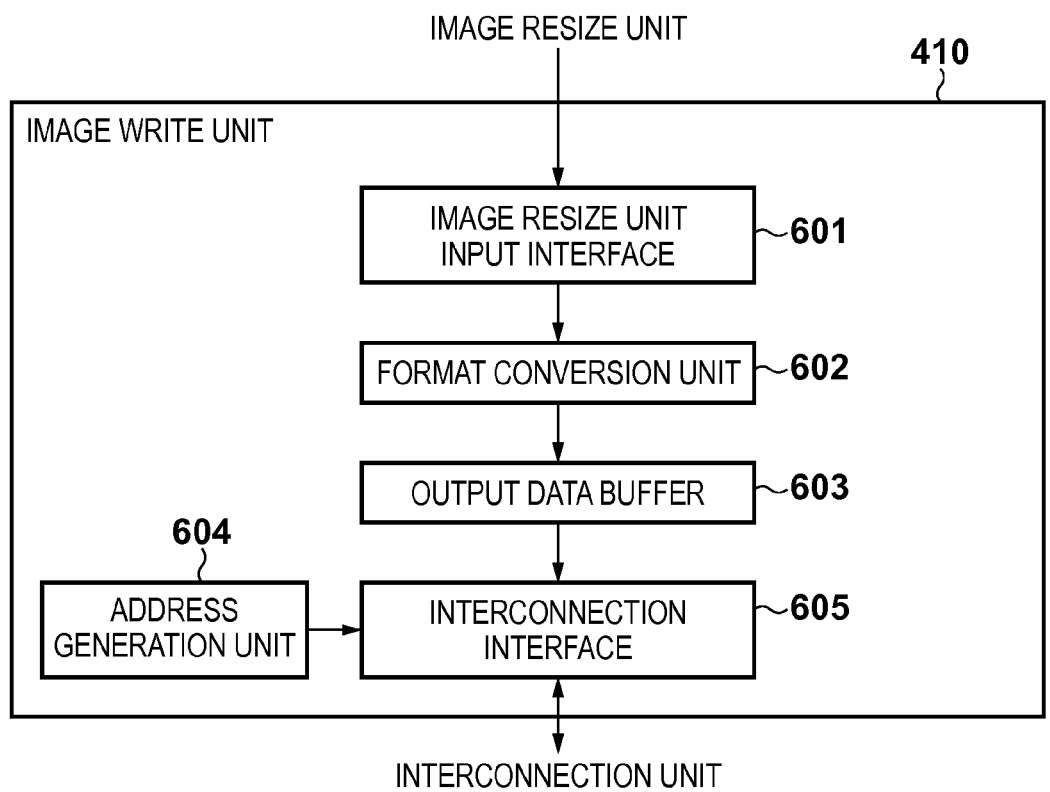
FIG. 6 is a block diagram showing the arrangement of an image write unit.

FIG. 6 exemplifies the functional arrangement of the image write unit 410. The image write unit 410 includes an image resize unit input interface 601, format conversion unit 602, output data buffer 603, address generation unit 604, and interconnection interface 605.

In the image write unit 410, first, resized image data output from the image resize unit 404 is input to the image resize unit input interface 601. Then, the image resize unit input interface 601 transmits the input image data to the format conversion unit 602. The format conversion unit 602 converts the image data output from the image resize unit 404 into a format suitable for write in the memory, and stores the converted image data in the output data buffer 603. The contents of conversion include, for example, division in the word or byte unit, padding, and data sorting. The converted image data stored in the output data buffer 603 is transmitted to the interconnection interface 605. The interconnection interface 605 writes the image data at a storage location in the resized output image storage area 412 that is designated by a write address generated by the address generation unit 604.

Figure 7:
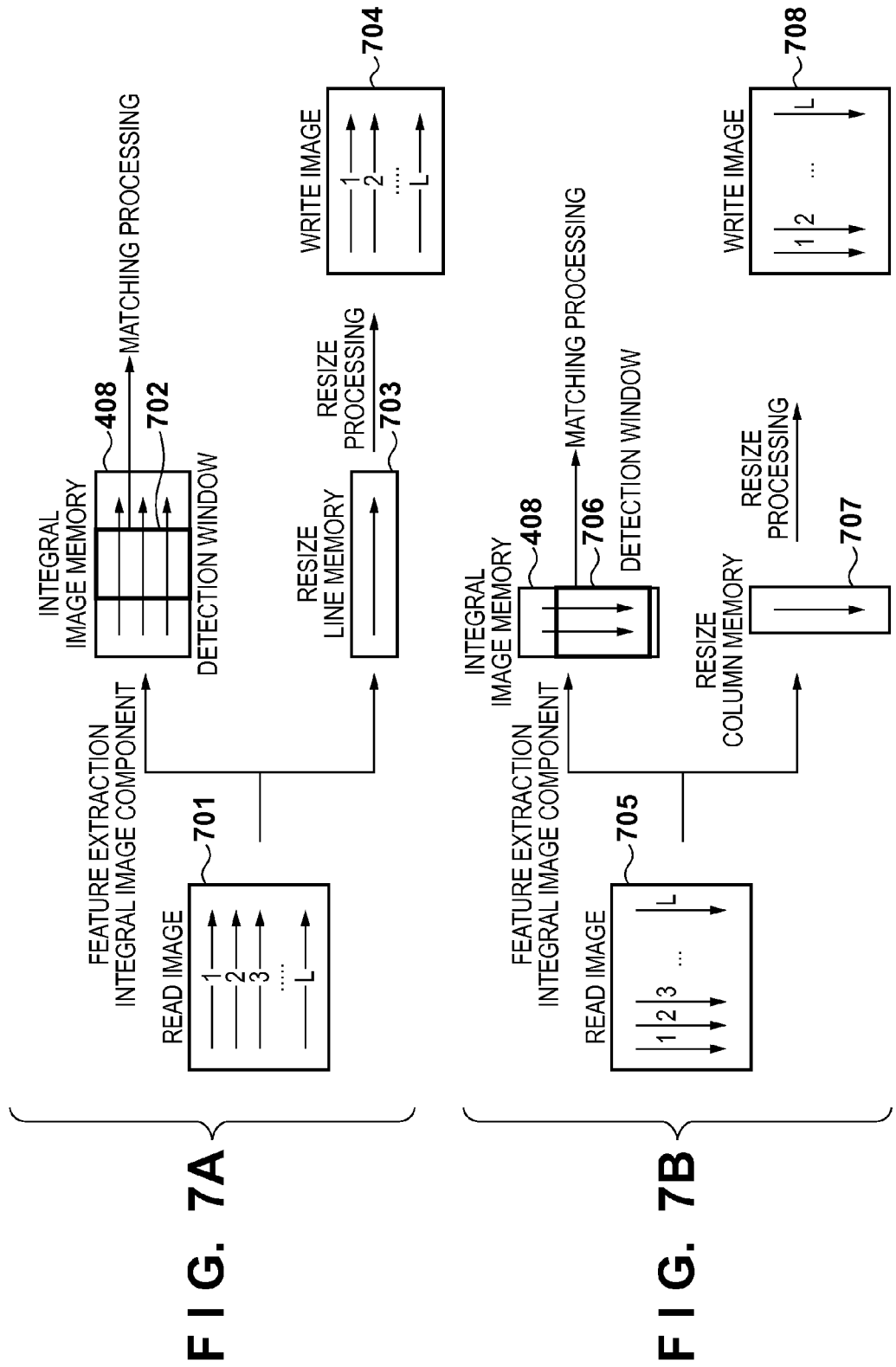
FIGS. 7A and 7B are views for explaining an image scanning method according to the first embodiment.

The processing operation of the image processing apparatus according to the embodiment will be explained with reference to FIG. 7A. FIG. 7A is an explanatory view when processing an input image while raster-scanning it (horizontal scan). To the contrary, FIG. 7B is an explanatory view when processing an input image while column-scanning it (vertical scan). First, raster scan in FIG. 7A will be exemplified.

In FIG. 7A, a read image 701 corresponds to an input image held in the input image storage area 411. The image readout unit 403 reads out image data by raster-scanning the read image 701 from left to right and from top to bottom, as shown in FIG. 7A. The readout image data is simultaneously transmitted to two units, that is, the detection unit 405 and image resize unit 404. The detection unit 405 executes feature extraction processing and integral image generation processing, and writes the execution result in the integral image memory 408. The matching processing unit 409 detects a target object by performing matching processing at the position of a detection window 702 serving as an area necessary to match the target object while moving the detection window 702 within the integral image memory 408. On the other hand, the image data transmitted from the image readout unit 403 to the image resize unit 404 are accumulated in a resize line memory 703 within the image resize unit 404 by an amount corresponding to the type of resize algorithm. For example, a memory of one line is required when the resize algorithm is bilinear interpolation, and the resize line memory 703 is not required when it is simple subsampling. If necessary, the image resize unit 404 performs resize processing while referring to an image data value accumulated in the resize line memory 703. The image resize unit 404 transmits the resized image data to the image write unit 410. The image write unit 410 writes the resized image data in the resized output image storage area 412 in a raster scan order as indicated by arrows 704. When no resized image need be generated, the image readout unit 403 may send image data to only the detection unit 405 so that neither the image resize unit 404 nor image write unit 410 operates.

Figure 1:
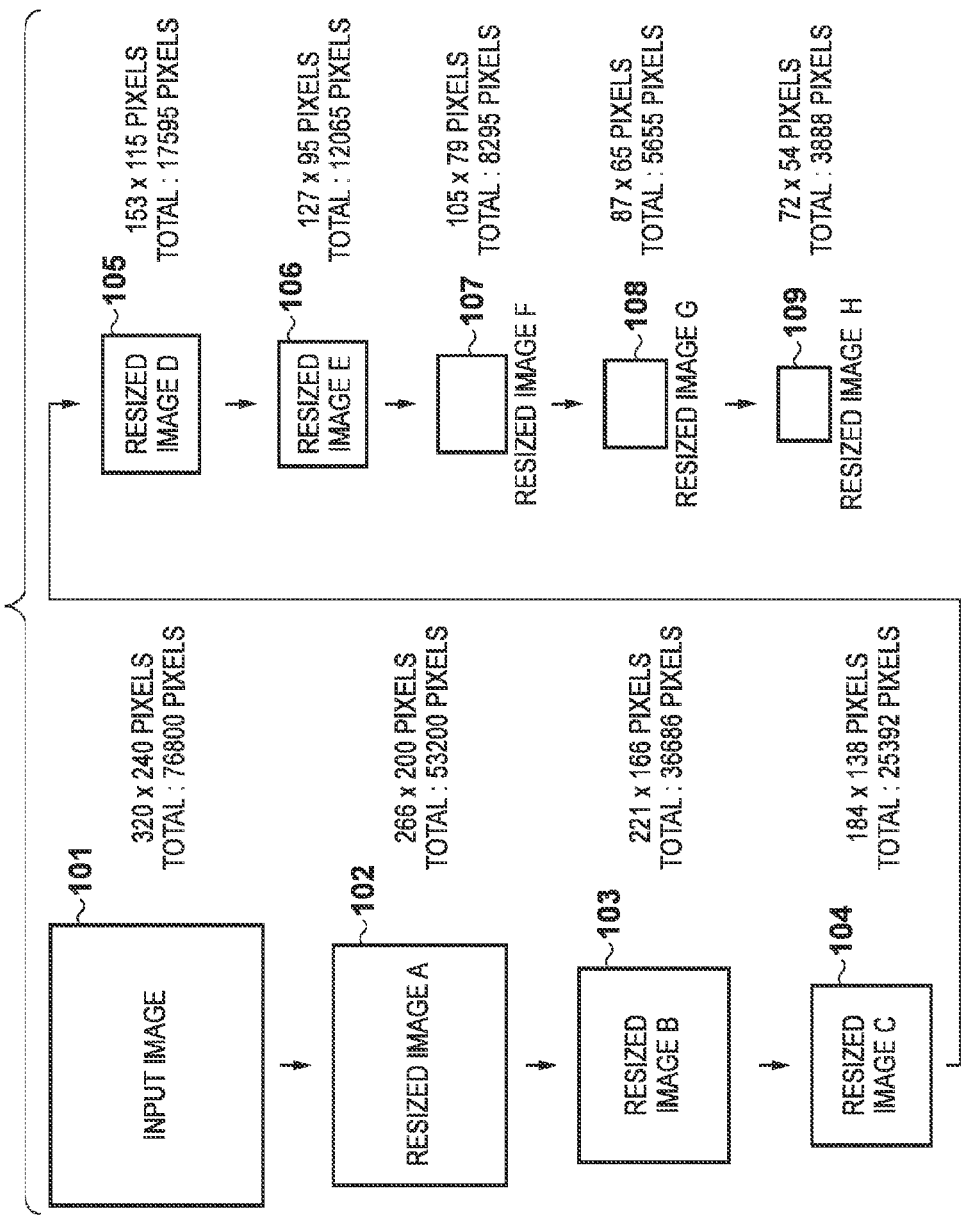
FIG. 1 is a view exemplifying pyramid images.
Figure 8:
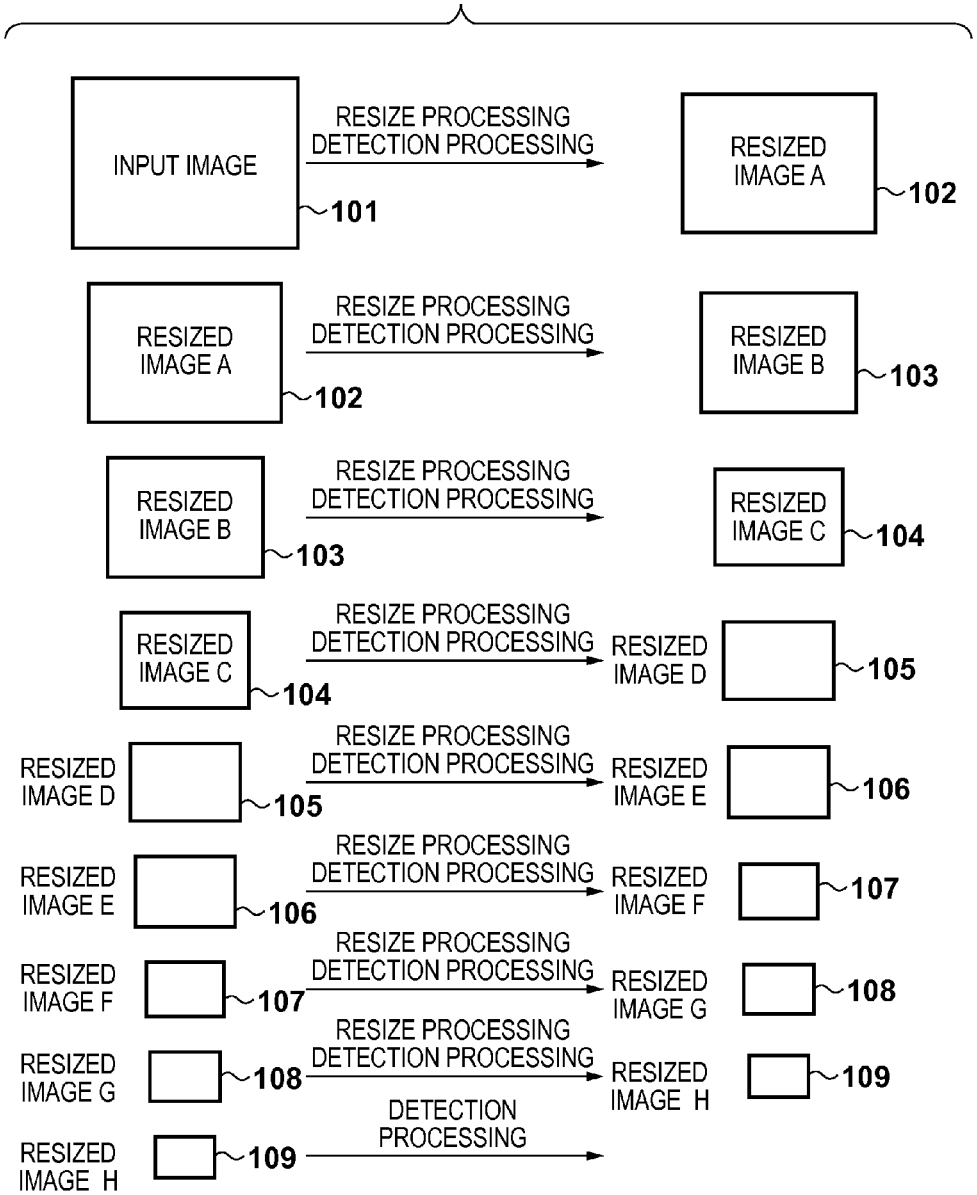
FIG. 8 is a view for explaining image memory access.

The access count to the image memory according to the first embodiment will be explained with reference to FIG. 8. In the embodiment, resize processing and detection processing can be executed in parallel because image data read out by the image readout unit 403 is simultaneously sent to the image resize unit 404 and detection unit 405. As shown in FIG. 8, while the resized image 102 is generated from the input image 101, detection processing for the input image 101 can be executed. Then, while the resized image 103 is generated using the resized image 102 as a new input, detection processing for the input image 102 can be executed. In the same manner, images at lower resolutions are processed, and detection processing is finally performed for the resized image 109, completing detection processing for all pyramid images. The pixel count represents an access count to the image memory when the pyramid images described with reference to FIG. 1 are processed as shown in FIG. 8. The image memory readout count R, image memory write count W, and access count N to the image memory are calculated in accordance with equations (4):

$$\left. \begin{array}{l} R = 76800 + 53200 + 36686 + \cdots + 5655 + 3888 = 239576 \\ W = 53200 + 36686 + 25392 + \cdots + 3888 = 162776 \\ N = R + W = 239576 + 162776 = 402352 \end{array} \right\} \quad (4)$$

The pixel count of the input image 101 is 76,800, that of the resized image 102 is 53,200, that of the resized image 103 is 36,686, . . . , that of the resized image 108 is 5,655, and that of the resized image 109 is 3,888. The readout count R is the sum of the pixel counts of the input image 101 and resized images 102 to 109. The write count W is the sum of the pixel counts of the resized images 102 to 109. The access count N to the image memory is the sum of the readout count R and write count W.

Figure 2A:
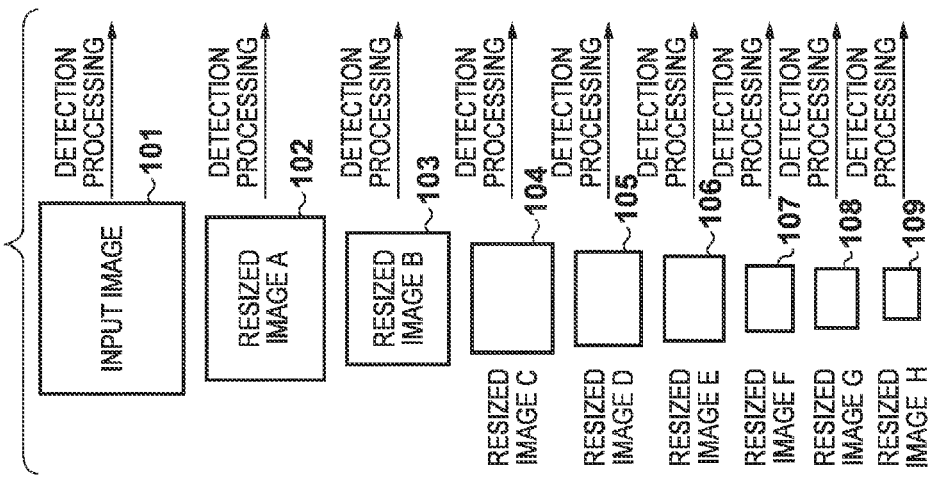
FIGS. 2A and 2B are views for explaining image memory access when detection processing is performed after pyramid image generation.
Figure 2B:
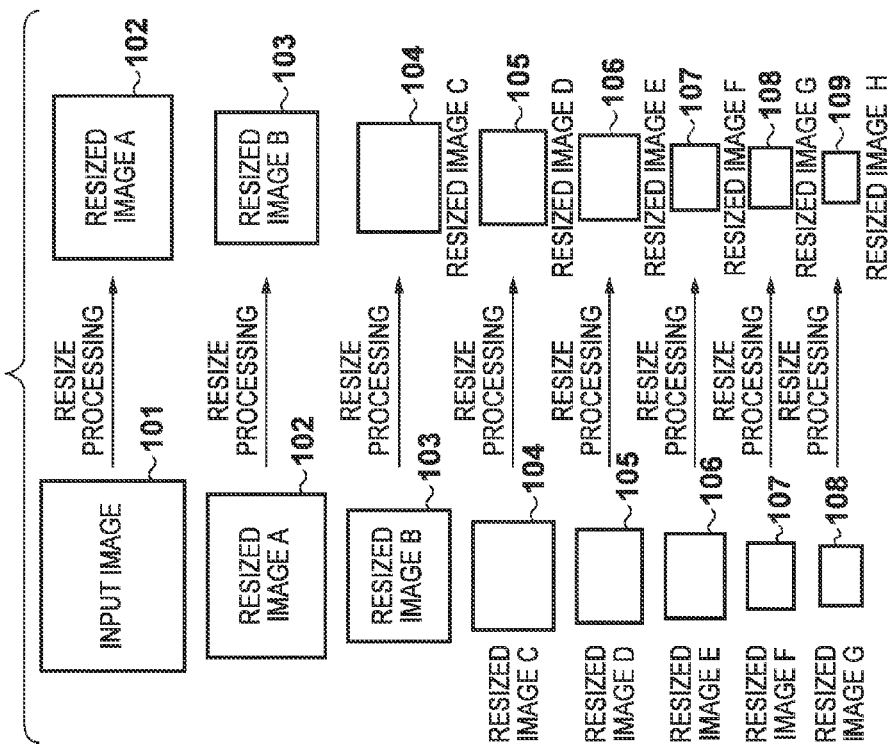
Figure 3:
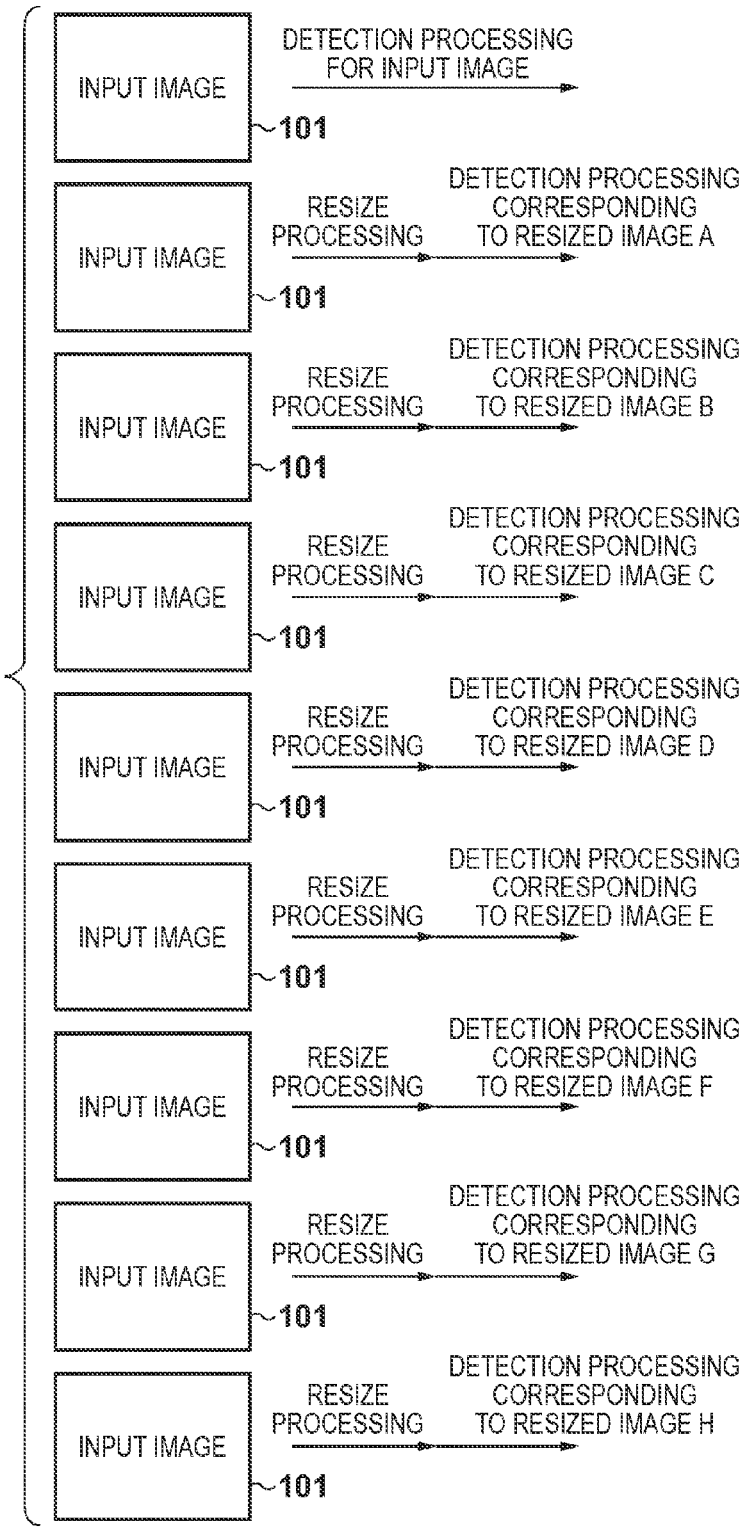
FIG. 3 is a view for explaining image memory access when resize processing and detection processing are executed in a pipeline manner.

The access count (402,352 pixels) to the image memory in the embodiment is compared with the access count (638,040 pixels) to the image memory in the processing described with reference to FIGS. 2A and 2B. The comparison result reveals that the embodiment can reduce the access count to the image memory because input image data for resize processing and input image data for detection processing are read out simultaneously. Further, the access count to the image memory in the embodiment is compared with the access count (691,200 pixels) to the image memory in the processing described with reference to FIG. 3. As is apparent from the comparison result, the embodiment can reduce the access count to the image memory because the size of an image to be read out decreases as the resolution decreases.

An example of raster-scanning an image has been explained. However, the same processing can be implemented even when image data is column-scanned (vertical scan), as shown in FIG. 7B. In FIG. 7B, a read image 705 corresponds to an input image held in the input image storage area 411. The image readout unit 403 reads out image data by column-scanning the read image 705 from top to bottom and from left to right, as shown in FIG. 7B. The readout image data is simultaneously transmitted to two units, that is, the detection unit 405 and image resize unit 404. The detection unit 405 executes feature extraction processing and integral image generation processing, and writes the execution result in the integral image memory 408 in the column scan order. The matching processing unit 409 detects a target object by performing matching processing at the position of a detection window 706 serving as an area necessary to verify the target object while moving the detection window 706 within the integral image memory 408. On the other hand, the image data transmitted from the image readout unit 403 to the image resize unit 404 are accumulated in a resize column memory 707 within the image resize unit 404 by an amount corresponding to the type of resize algorithm. If necessary, the image resize unit 404 performs resize processing while referring to an image data value accumulated in the resize column memory 707. The image resize unit 404 transmits the resized image data to the image write unit 410. The image write unit 410 writes the resized image data in the resized output image storage area 412 in a column scan order as indicated by arrows 708.

In the above description, an integral image is generated in the detection unit 405, accumulated in the integral image memory 408, and undergoes matching processing. However, the present invention is applicable even when an output from the feature extraction unit 406 is directly stored in the memory and a target object is detected without generating an integral image.

In the embodiment, images are processed in order from a high resolution to a low resolution, so the image resize unit 404 performs only resize processing. However, when images are processed in order from a low resolution to a high resolution or in a different order, the image resize unit 404 may be replaced with a resolution conversion unit capable of resolution conversion processing including enlargement processing. Even in this case, the present invention is applicable.

The embodiment has described one memory 401, but the number of memories is arbitrary. Also, a memory which stores an input image and a memory which stores a resized output image may be the same or different. Detection processing to be executed in the detection unit 405 according to the embodiment is applied not only when an unspecific target object such as a face or human body is detected, but also when a target object belonging to a given category or a specific person or object is detected.

As described above, the first embodiment can reduce the access count to the image memory.

Second Embodiment

Figure 9A:
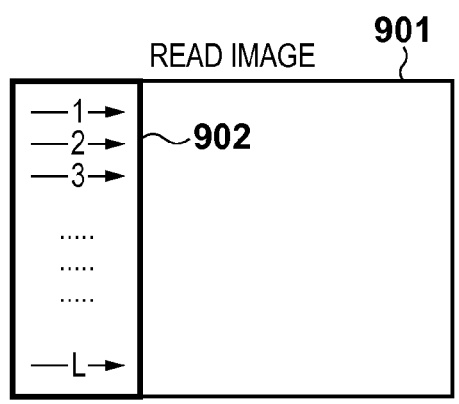
FIGS. 9A to 9D are views for explaining band division.
Figure 9B:
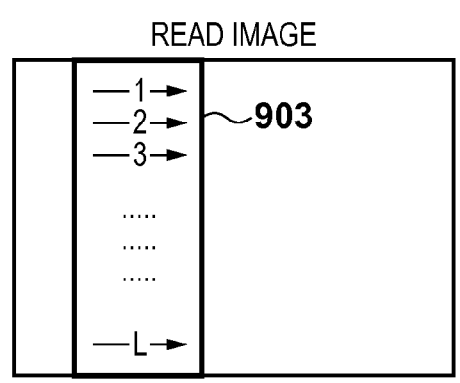
Figure 9C:
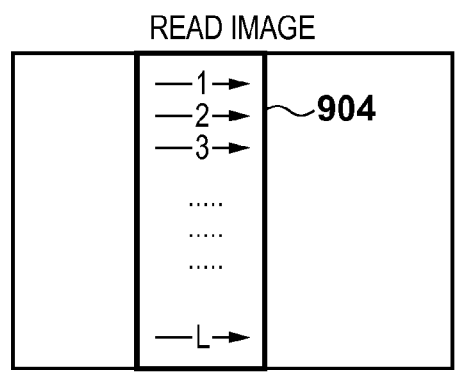
Figure 9D:
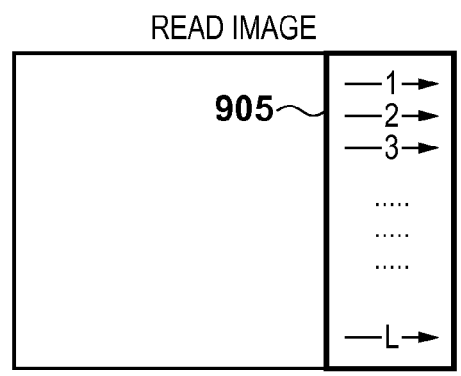

The second embodiment of the present invention will be described below with reference to the accompanying drawings. The second embodiment will examine a case in which a read image is divided into bands and processed. FIGS. 9A to 9D are explanatory views when a read image 901 is divided into a plurality of band data in the vertical direction and processed. In FIG. 9A, a band 902 is the first band data obtained by dividing the read image 901 into bands in the vertical direction. The band 902 is read from top to bottom in the raster scan order. After the end of reading and processing the band 902, a band 903 is read as shown in FIG. 9B. At this time, the bands 902 and 903 need to overlap each other in the horizontal direction in consideration of the size (about several tens to several hundreds of pixels depending on the target object) of the detection window of the target object. After the end of reading and processing the band 903, a band 904 is read as shown in FIG. 9C. The bands 903 and 904 also need to overlap each other in the horizontal direction in consideration of the size of the detection window. In the same manner, a band that overlaps in the horizontal direction is read and processed. At the end of the read image 901, a final band 905 shown in FIG. 9D is read and processed. In this fashion, band data overlap each other.

Figure 10:
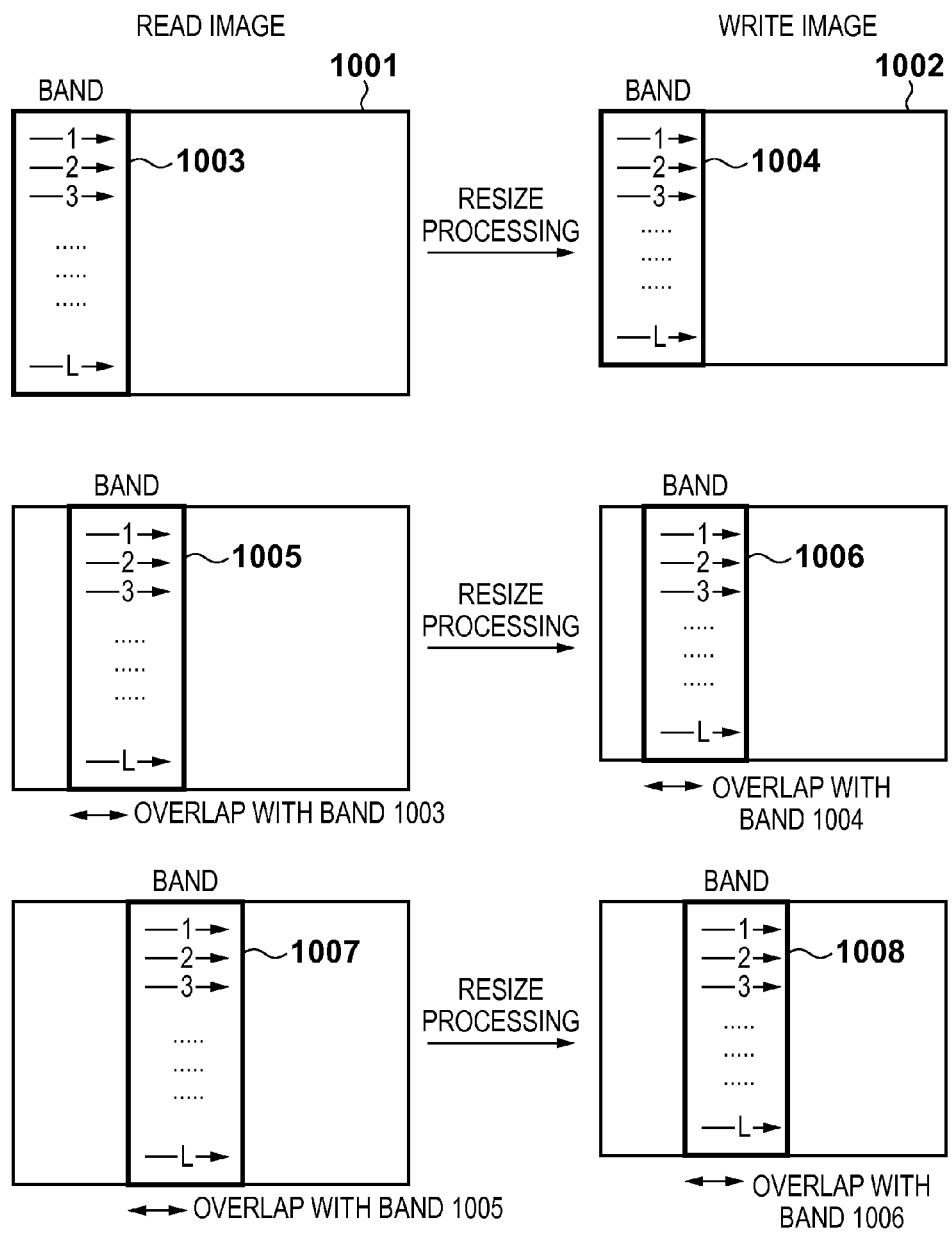
FIG. 10 is a view for explaining image memory access in band division processing in the absence of an image extraction unit.

Access to the image memory when band division is performed as shown in FIGS. 9A to 9D and resize processing is executed as described in the first embodiment will be explained with reference to FIG. 10. In FIG. 10, a read image 1001 is divided into bands in the vertical direction, simultaneously undergoes resize processing and detection processing, and is written on a write image 1002 for each band. First, a band 1003 simultaneously undergoes resize processing and detection processing, and is written in a band 1004. Then, a band 1005 simultaneously undergoes resize processing and detection processing, and is written in a band 1006. Further, a band 1007 simultaneously undergoes resize processing and detection processing, and is written in a band 1008. Band processing continues in the same way till the end of processing the entire read image. As described with reference to FIGS. 9A to 9D, the bands 1003 and 1005, bands 1005 and 1007, . . . , and bands N and N+2 of the read image need to overlap each other in the horizontal direction in consideration of the detection window size. As a result of resizing and outputting an overlapping input band, the bands 1004, 1006, and 1008 on the write image also similarly overlap each other in the horizontal direction. As described above, the horizontal size of the detection window is about several tens of pixels, so adjacent bands on the write image also overlap each other in the horizontal direction by several tens of pixels. Since the overlap between bands is not considered in calculation of the access count to the memory in FIG. 8, the access count to the memory increases, compared to FIG. 8. An image processing apparatus according to the second embodiment suppresses an increase in access count to the memory caused by the overlap between bands.

Figure 11:
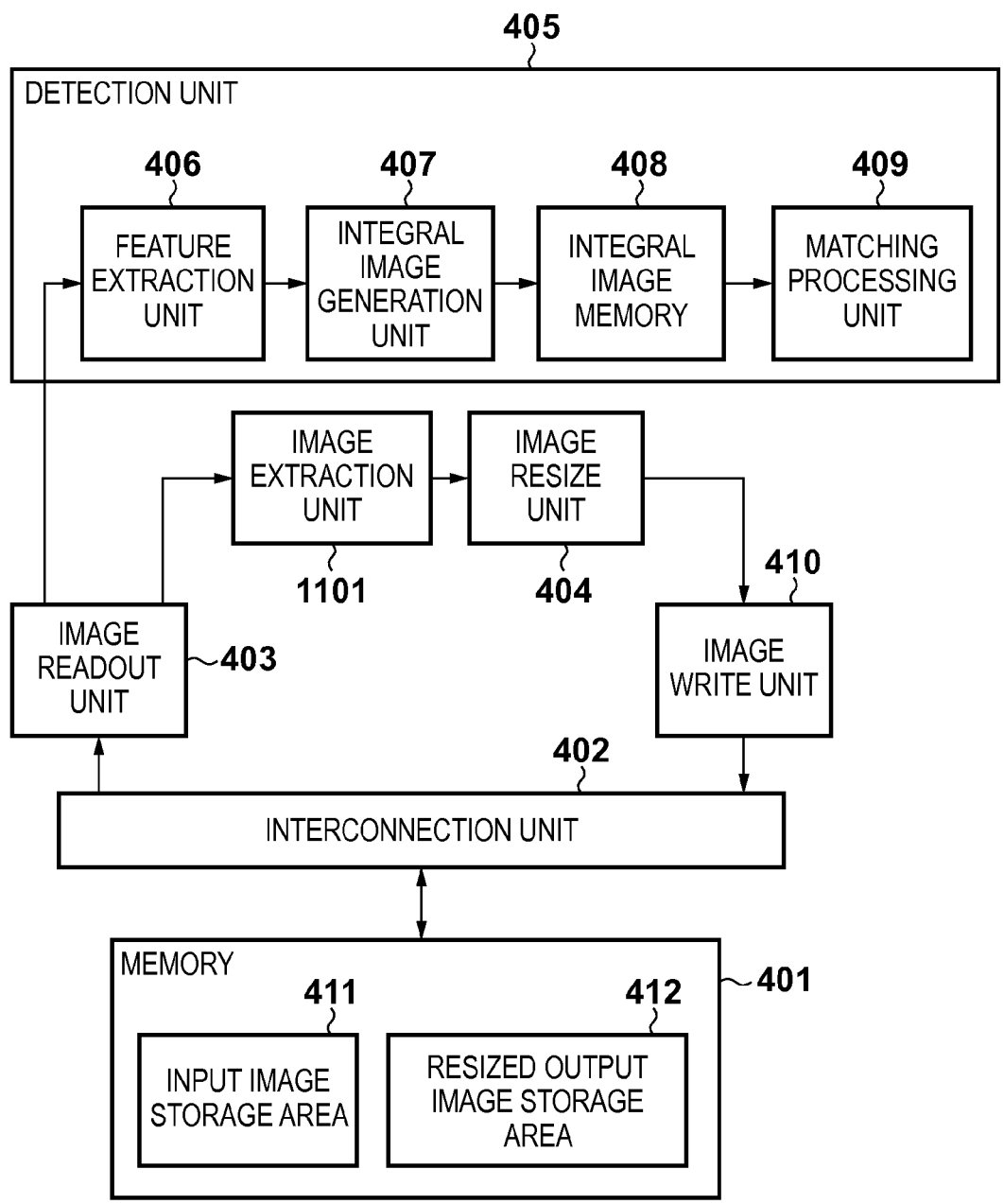
FIG. 11 is a block diagram showing the functional arrangement of an image processing apparatus according to the second embodiment.

FIG. 11 exemplifies the functional arrangement of the image processing apparatus according to the second embodiment. The functional arrangement of the image processing apparatus shown in FIG. 11 is similar to the functional arrangement example of the image processing apparatus according to the first embodiment described with reference to FIG. 4. The image processing apparatus according to the second embodiment is different from the image processing apparatus according to the first embodiment in that an image extraction unit 1101 is placed between an image readout unit 403 and an image resize unit 404, in addition to the functional arrangement shown in FIG. 4. The image extraction unit 1101 has a function of removing a designated number of pixels on the left side, right side, or both sides of an image from image data sent from the image readout unit 403, and supplying the extracted image to the image resize unit 404.

In FIG. 11, the image extraction unit 1101 is placed between the image readout unit 403 and the image resize unit 404. However, the image extraction unit 1101 may be placed between the image resize unit 404 and the image write unit 410.

Figure 12:
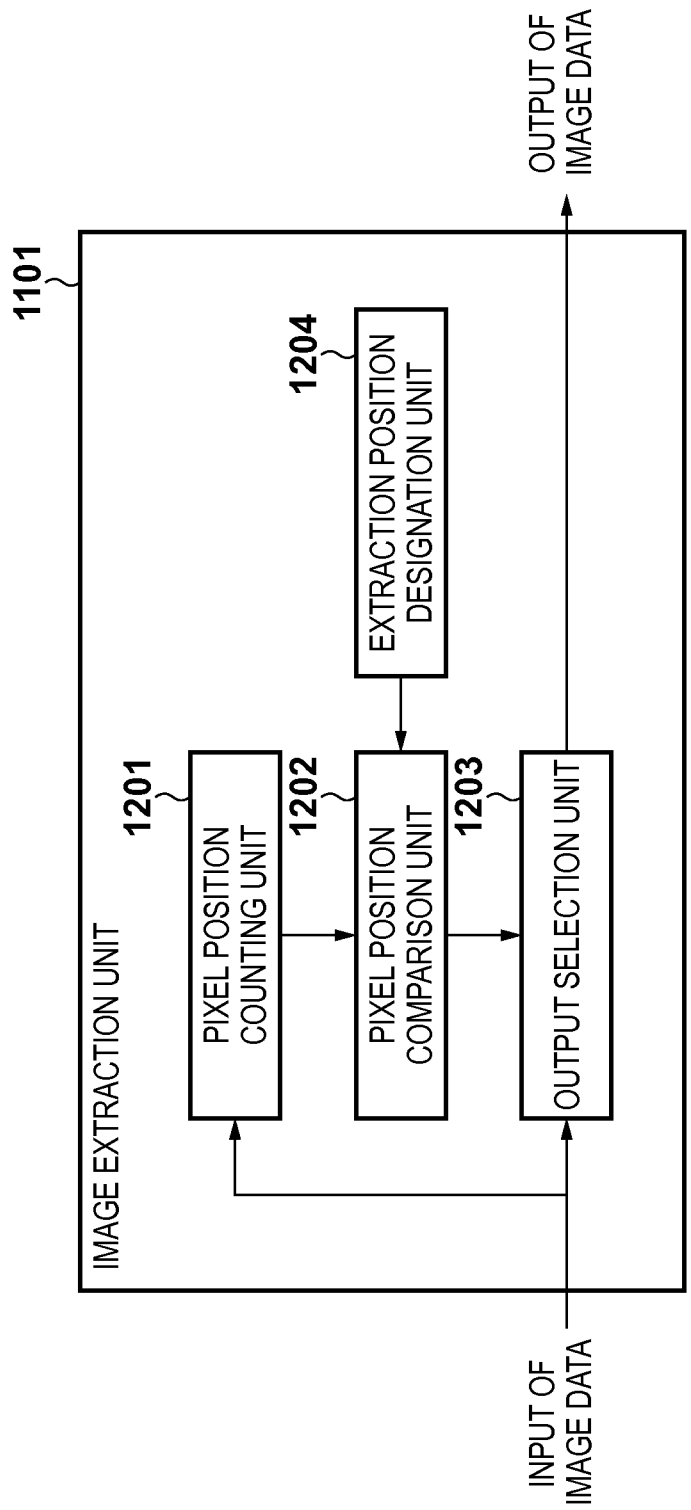
FIG. 12 is a block diagram showing the arrangement of the image extraction unit.

FIG. 12 exemplifies the internal arrangement of the image extraction unit 1101. The image extraction unit 1101 includes a pixel position counting unit 1201, pixel position comparison unit 1202, output selection unit 1203, and extraction position designation unit 1204. Image data input to the image extraction unit 1101 is sent to the output selection unit 1203 and also to the pixel position counting unit 1201. The pixel position counting unit 1201 counts the coordinate position of a pixel in the image. The pixel position counting unit 1201 outputs a pixel position corresponding to the input image data to the pixel position comparison unit 1202. The extraction position designation unit 1204 designates extraction position information indicating the position of an image to be extracted. The extraction position is designated to decrease an overlap between band data. The extraction position designation unit 1204 outputs the designated extraction position to the pixel position comparison unit 1202. The pixel position comparison unit 1202 compares the pixel position of the input image data that has been received from the pixel position counting unit 1201 with the extraction position information received from the extraction position designation unit 1204. The pixel position comparison unit 1202 determines whether the input image data exists at the position of a pixel to be output or the position of a pixel to be removed. The result of determination by the pixel position comparison unit 1202 is sent to the output selection unit 1203. Based on the result of determination by the pixel position comparison unit 1202, the output selection unit 1203 selects whether to output the input image data.

Figure 13:
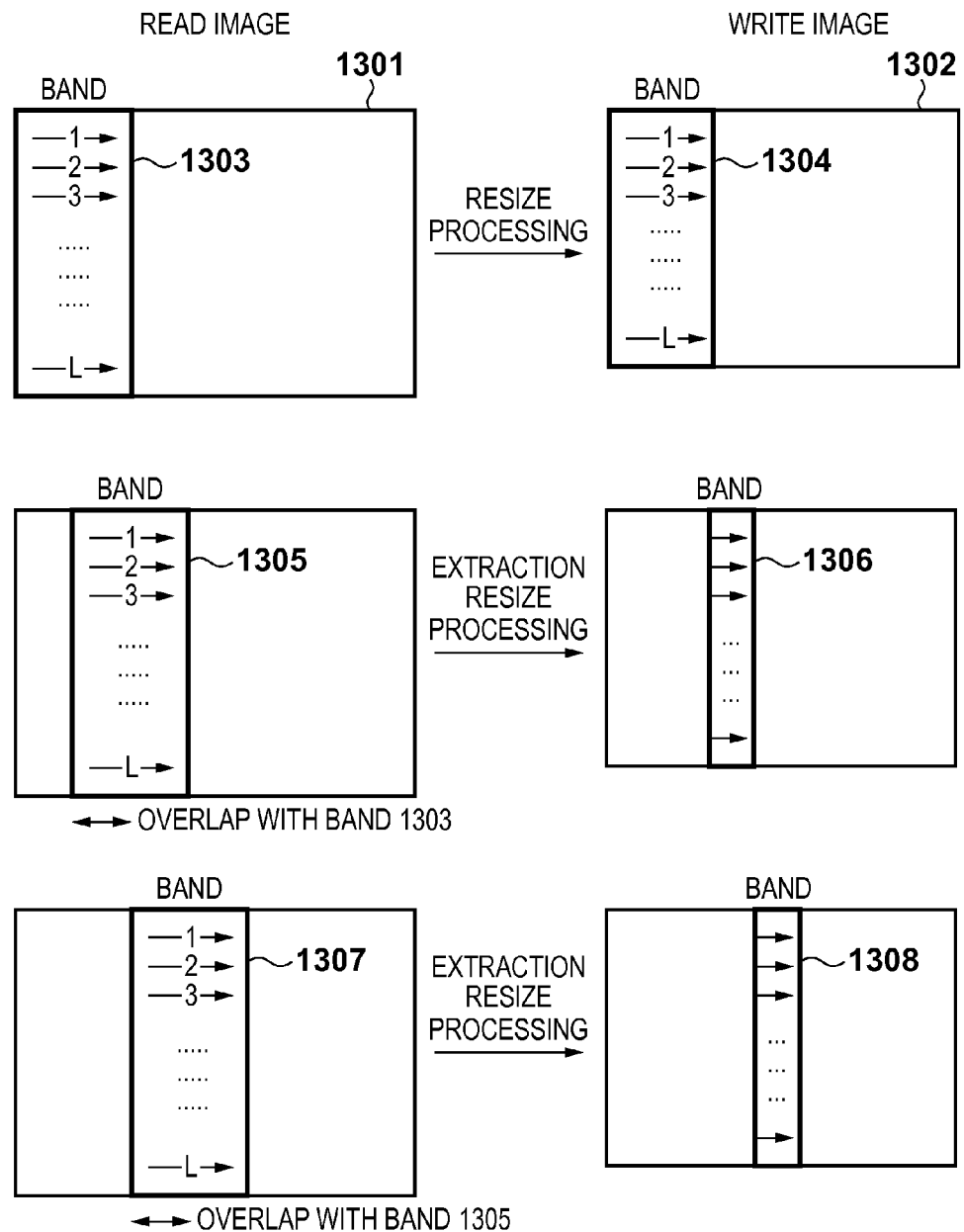
FIG. 13 is a view for explaining image memory access in band division processing in the presence of the image extraction unit.

A processing operation according to the second embodiment will be explained with reference to FIG. 13. In FIG. 13, a read image 1301 is divided into bands in the vertical direction, simultaneously undergoes resize processing and detection processing, and is written on a write image 1302 for each band data. In FIG. 13, a first band 1303 obtained by dividing the read image 1301 does not undergo extraction processing by the image extraction unit 1101, and the entire band is resized and written in a band 1304. A band 1305 read next overlaps the band 1303 by several tens of pixels in the horizontal direction in consideration of the detection window size, as described above. As for the band 1305, the image extraction unit 1101 extracts and removes a portion unnecessary for resize processing out of the overlap with the band 1303 to prevent overlapping on the write image 1302. That is, overlapping between the band 1304 and a band 1306 on the write image 1302 can be avoided, as shown in FIG. 13. The overlapping amount necessary for resize processing changes depending on the resize algorithm such as bilinear interpolation, bicubic interpolation, or simple subsampling. For example, for bilinear interpolation, resize processing is possible as long as bands overlap each other by one pixel. Hence, in bilinear interpolation, the image extraction unit 1101 is set so that the overlapping amount of the left side of the band 1306 on the band 1304 becomes one pixel. As for a band 1307, the image extraction unit 1101 executes the same extraction processing to avoid overlapping between a band 1308 and the band 1306 on the write image 1302. This also applies to subsequent band processing. As for the image extraction position by the image extraction unit 1101, the extraction position designation unit 1204 sets an appropriate value for each band, thereby implementing the above-described operation.

As described above, in the second embodiment, the extraction position by the image extraction unit upon band division is properly set to remove a portion unnecessary for resize processing. As a result, the second embodiment can decrease an overlap between bands on a write image even upon band division, and reduce the access count to the memory.

In the above description of the operation, the image extraction unit 1101 removes only the left side of an image. However, when the band processing order is from right to left, the right side of an image may be removed. The embodiment copes with both of the band processing orders from left to right and from right to left. Thus, the image extraction unit 1101 may remove designated numbers of pixels from both sides of an image.

In the second embodiment, an image is divided into bands in the vertical direction. However, even when an image is divided into bands in the horizontal direction, the present invention is applicable by changing the image extraction direction from the horizontal direction to the vertical direction by the image extraction unit.

The present invention can reduce the access count to the image memory.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable storage medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-094376 filed on Apr. 20, 2011, which is hereby incorporated by reference herein in its entirety.

What is claimed is:

1. An image processing apparatus comprising:
a processor and a memory, cooperating to function as:
a storage unit configured to store image data;
a readout unit configured to read out the image data stored in said storage unit;
a detection unit configured to detect a target object from the image data read out by said readout unit;
a reducing unit configured to reduce the image data readout by said readout unit; and
a write unit configured to write the image data reduced by said reducing unit in said storage unit,
wherein said readout unit repetitively reads out previously reduced image data and simultaneously outputs the previously reduced image data in parallel to said detection unit and said reducing unit, thereby detection of the target object from the previously reduced image data by said detection unit and further reduction of the previously reduced image data by said reducing unit are performed in parallel.

2. The apparatus according to claim 1, further comprising a division unit configured to divide the image data into a plurality of band data having portions overlapping each other.

3. The apparatus according to claim 2, wherein said detection unit detects the target object from each of the band data divided by said division unit, and
said reducing unit reduces each of the band data divided by the division unit.

4. The apparatus according to claim 2, further comprising:
a designation unit configured to designate a pixel position serving as an extraction target in the band data to decrease the overlapping portion between the band data; and
an extraction unit configured to extract data at the pixel position designated by said designation unit from the band data,
wherein said reducing unit reduces the data at the pixel position that has been extracted by said extraction unit.

5. A method of controlling an image processing apparatus which detects a target object from image data, comprising:
storing image data in a storage unit;
a readout step of reading out the image data stored in the storage unit;
a detection step of causing a detection unit to detect the target object from the image data readout in the readout step;
a reducing step of causing a reducing unit to reduce the image data readout in the readout step; and
a write step of writing, in the storage unit, image data reduced in the reducing step,
wherein in the readout step, the readout unit repetitively reads out previously reduced image data and simultaneously outputs the previously reduced image data in parallel to the detection unit and the reducing unit, thereby detection of the target object from the previously reduced image data by said detection unit and further reduction of the previously reduced image data by the reducing unit are performed in parallel.

6. A non-transitory computer-readable storage medium storing a computer program for causing a computer to execute an image processing apparatus control, the program comprising code to execute:
storing image data in a storage unit;
a readout step of reading out the image data stored in the storage unit;
a detection step of causing a detection unit to detect the target object from the image data readout in the readout step;
a reducing step of causing a reducing unit to reduce the image data readout in the readout step; and
a write step of writing, in the storage unit, image data reduced in the reducing step,
wherein in the readout step, the readout unit repetitively reads out previously reduced image data and simultaneously outputs the previously reduced image data in parallel to the detection unit and the reducing unit, thereby detection of the target object from the previously reduced image data by said detection unit and further reduction of the previously reduced image data by the reducing unit are performed in parallel.

* * * * *